Aug. 8, 1950   J. KOMM   2,518,151
ALTIMETER INDICATOR
Filed Sept. 15, 1944
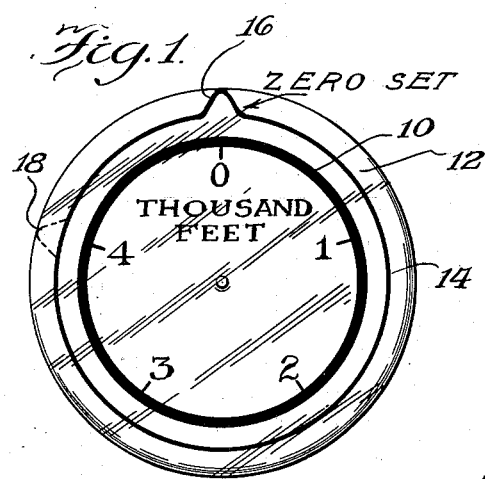
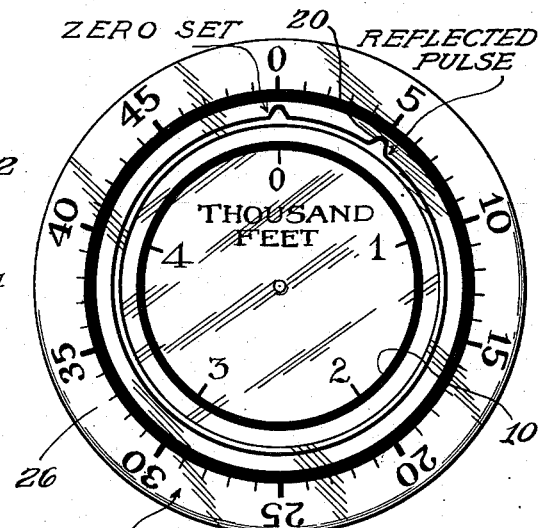
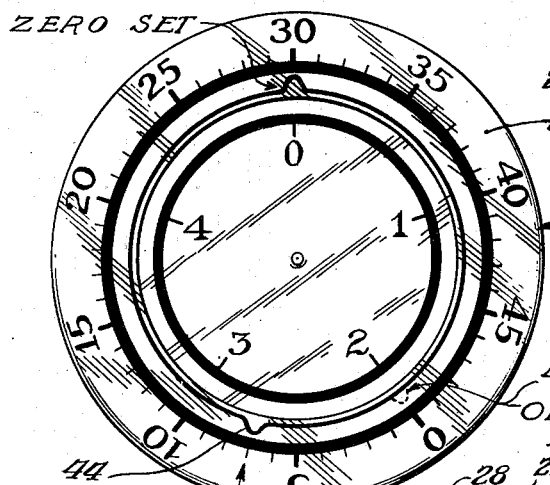
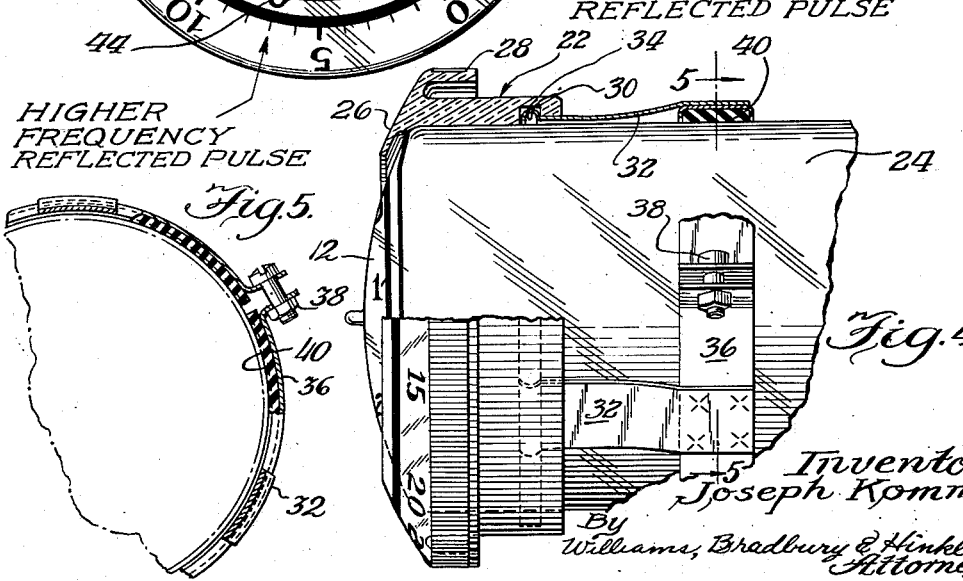
Inventor
Joseph Komm
By Williams, Bradbury & Hinkle
Attorneys Patented Aug. 8, 1950

2,518,151

UNITED STATES PATENT OFFICE 2,518,151

ALTIMETER INDICATOR

Joseph Komm, Chicago, Ill., assignor to Stewart-Warner Corporation, Chicago, Ill., a corporation of Virginia Application September 15, 1944, Serial No. 554,188

4 Claims. (Cl. 343—13)

1

The present invention relates to improvements in altimeters and has for its primary object a provision of a new and improved multiple range altimeter.

In electronic (radio) altimeters of the type employing cathode ray oscilloscopes to indicate transmitted and reflected pulses to provide an indication of the height of an airplane above the earth, it is not always easy to ascertain the exact height or altitude. This is particularly true of the type of apparatus in which the cathode ray beam is rotated around the viewing screen of an oscilloscope, and other apparatus where the dial scale is such that readings are repeated. For instance, in one apparatus of this type, one complete rotation of the pulse around the screen of the oscilloscope represents an assigned unit of distance, such, for example, as 5000 feet. The transmitted pulse occurs, or is adjusted to occur, at the zero point of the altimeter dial and the reflected pulse is angularly spaced therefrom a distance corresponding to the altitude. Consequently, the frequency of rotation of the electron beam and repetition of the pulse is 98.356 kilocycles. Altitudes below 5000 feet are easily ascertained because they are directly readable, but when reading altitudes above 5000 feet, it is necessary to add a figure of 5000 feet, or a multiple thereof, to the dial indication, depending upon the number of times the beam makes a complete rotation in the ascent to the particular altitude. Keeping track of the figure to be added to the actual dial reading may become confusing.

One way to eliminate the foregoing difficulty is to increase the range of altitude represented by one revolution of the reflected pulse by decreasing the speed of rotation of the beam and the pulse repetition frequency. If decreased to one-tenth, then one rotation of the reflected pulse represents an altitude of 50,000 feet. Decreasing the frequency of rotation of the electron beam has, however, a drawback in that when the frequency is decreased, the power output also drops with the result that the altimeter has a limited range inadequate for some purposes.

The present invention has for its object an altimeter enabling altitudes in excess of those indicated by a single cycle or rotation of the beam readily and accurately to be indicated.

Another object of the present invention resides in the provision of a new and improved multiple range altimeter, one range corresponding to that now conventionally used in altimeters and another range corresponding to a desired

2 multiple of the first range, as, for instance, ten times the first.

A further object of the present invention is to provide a new and improved multiple range altimeter wherein the multiple range readings are obtained by rotating the cathode ray beam at two velocities differing in accordance with the ranges from each other. One of these velocities may be that now conventionally used and another, for example, be a frequency of one-tenth greater than the former.

A more specific object of the present invention is to provide a multiple range altimeter including a pair of dials, the first of which may correspond to the dials now conventionally used, and the other of which is rotatable relative to the first, and by means of which altitudes in excess of the single cycle limit of the first dial may be readily ascertained.

Other objects and advantages of the present invention will become apparent from the ensuing description, in the course of which reference is had to the accompanying drawing, in which:

Fig. 1 illustrates the viewing screen of a known type of altimeter;

Figs. 2 and 3 are illustrations of the viewing screen of the altimeter of the present invention, the former of which indicates an altitude corresponding to that indicated in Fig. 1, and the latter of which illustrates an altitude in excess of the altitudes illustrated in Figs. 1 and 2, and with the altimeter conditioned and adjusted directly to indicate the altitude;

Fig. 4 is a fragmentary view of an altimeter oscilloscope constructed in accordance with the present invention; and Fig. 5 is a fragmentary cross-sectional view taken along the line 5—5 of Fig. 4.

Inasmuch as known types of electronic or radio altimeters may be used with the present invention, various parts of such an altimeter, including the pulse transmitting and receiving components, have not been illustrated. The apparatus of the present invention may be, for instance, the United States Army altimeter type 718B which operates at a frequency of 98.356 kilocycles and includes a dial calibrated to read from zero to 5000 feet. In other words, the cathode ray beam makes one complete sweep around the viewing screen for each 5000 feet of altitude. In addition, the apparatus includes means for selectively altering the frequency so that the cathode ray beam sweeps over more than a full circle for 5000 feet. For instance, it may sweep over one and one-tenths times a full circle or through 396 degrees for each 5000 feet. This increased frequency of rotation of the cathode ray beam may be provided by altering the constants of the oscillator or by a separate oscillator, and, since the apparatus for doing this may be of conventional construction, the apparatus has not been disclosed in detail.

Referring now more particularly to the known type of apparatus illustrated in Fig. 1, the dial 10 is calibrated to read from zero to 5000 feet. The dial is suitably marked upon the viewing screen 12 of the cathode ray oscilloscope, around the peripheral portion of which the cathode ray beam is rotated to produce a generally circular curve or graph 14. The apparatus is so adjusted that the transmitted pulse produces a generally radially outwardly extending tooth-like discontinuity 16 at the zero point of the dial. The received reflected pulse produces a similar discontinuity such, for instance, as that indicated by the dotted line curve 18 at 4000 feet. When the received reflected pulse coincides with the transmitted pulse, as is the case in Fig. 1, then the altitude is 5000 feet or some multiple thereof. In an apparatus having a screen such as that illustrated in Fig. 1, it is, as heretofore pointed out, difficult to keep track of altitudes in excess of 5000 feet, as these are repetitions of readings below 5000 feet.

The apparatus of the present invention provides means for readily determining altitudes in excess of the normal range or single cycle. It comprises means for selectively rotating the cathode ray beam say at the usual velocity and at a higher velocity and a dial movable relative to the fixed dial 10 and calibrated to give direct readings of altitude when properly adjusted, as described in detail hereinafter. The readings at the two velocities are noted and the reading at the lower velocity is used as a reference or zero point to which the movable dial is adjusted and from which the altitude is then read directly at the higher velocity. The movable dial is, in effect, utilized to read the difference between the positions of the reflected pulse at the two velocities and it is preferably so calibrated that the difference represents the actual altitude.

When the cathode ray beam is rotated at a higher velocity than that at which it is rotated in Fig. 1, then, assuming that the aircraft upon which the apparatus is installed is again at an altitude of 5000 feet, the reflected pulse moves farther angularly than it does in Fig. 1, i. e., it is received when the cathode ray beam has traveled more than 360 degrees. If the velocity is increased one-tenth or ten per cent, then the reflected pulse will be received when the beam has traveled 396 degrees, as indicated by the reference character 20 in Fig. 2. The position of the reflected pulse thus moves angularly forward ten per cent, or 36 degrees, for each 5000 foot increase in altitude, and a full revolution for 50,000 feet. Accordingly, if the second dial be provided with ten equally spaced lines, each of these lines indicates altitudes of 5000 feet so that the dial as a whole will read from zero to 50,000 in increments of 5000 feet.

In the instant case the second and movable dial is indicated as a whole by reference character 22 and it is provided with a dial reading from zero to 50,000 feet in main increments of 5000 feet as may be readily noted from Figs. 2 and 3. One embodiment of the dial is illustrated in Figs. 4 and 5 to which reference is now had. The dial 22 may be constructed of glass and be mounted for rotation about the forward portion of a cathode ray tube 24. It has an inclined front 26 upon which the scale divisions are suitably indicated, and a backwardly extending knurled flange 28 whereby it may be readily rotated relative to the fixed dial.

The rotatable dial 22 may be rotatably secured to the cathode ray tube in suitable manner. In the instant embodiment the dial is provided with an inwardly disposed annular slot 30 near its rear end receiving spring fingers 32 fixedly secured to the cathode ray tube 24. The spring fingers have outwardly extending projections 34 extending into the groove 30 whereby the dial 22 is held against axial displacement but is rotatable. The spring fingers 32 are secured to a strap 36 encircling and secured to the cathode ray tube by clamping means 38. The strap is spaced from the tube by yieldable material, such as the rubber 40.

It is a comparatively easy matter, therefore, to note altitudes which are multiples of 5000, as the rotatable dial may be left in the position in which it is indicated in Fig. 2, i. e., the zero of dial 22 remains at the locus of the low velocity reflected pulse. For each 5000 feet the higher velocity reflected pulse moves forward (clockwise) 36 degrees. Altitudes other than mulitples of 5000 require movement of dial 22 so that its zero is at the locus of the reflected pulse at the lower velocity, after which the altitude is read from dial 22 at the locus of the reflected higher velocity pulse, as will now be described in connection with Fig. 3.

Assuming that the aircraft is at an altitude of 7000 feet, then the zero (transmitted) pulse will appear in its usual zero position. With the apparatus operating at the lower frequency, i. e., the one conventionally used, the lower velocity reflected pulse occurs at 2000 on the fixed scale as indicated by reference character 42 in Fig. 3. It may be noted, therefore, that with this lower frequency the cathode ray beam has made one and four-tenths revolutions.

The apparatus is then operated at the higher frequency, i. e., a frequency one and one-tenth times the normal frequency, so that the cathode ray beam travels one and one-tenth times as far. In other words, it travels 1.54 turns so that the higher velocity reflected pulse appears at the locus indicated by reference character 44 in Fig. 3. The difference between the two readings is thus 1.54 turns minus 1.4 turns, or .14 of a turn. A difference of one-tenth turn is equal to 5000 feet so that a difference of .14 of a turn is equal to 7000 feet, or assumed altitude.

In order to avoid the necessity of calculating the altitude represented by the angular space between the reflected low and high velocity pulses, and to enable the altitude to be read directly at the higher velocity, the dial 22 is made movable, as already indicated. To read the altitude directly, the apparatus is first operated at the lower beam velocity and the dial 22 turned so that its zero is at the locus 42 (Fig. 3) of the reflected pulse. The apparatus is then operated at the higher beam velocity and the altitude is read directly from the dial 22 at the position 44 of the reflected pulse. From Fig. 3 it may be noted that at this position of the pulse the movable dial indicates an altitude of 7000 feet.

Reviewing briefly the operation of the apparatus, the first step is the operation at the beam lower velocity, just as in the conventional apparatus. The second step is the rotation of dial 22 so that its zero coincides with the reflected pulse at the lower frequency. The third and final step is the operation of the apparatus at the higher beam velocity and the reading of the altitude at the locus of the reflected pulse relative to the movable dial.

It is not necessary that the beam velocities or frequencies mentioned be used. A lower velocity corresponding to that now used is convenient and a velocity one-tenth greater is suitable because it gives the meter wide range. The desired range may be varied by varying the beam velocity or frequency. If a range up to 10,000 feet is desired the higher beam velocity would have to be 1.5 times the lower one; for a range up to 100,000 feet, the higher beam velocity would be 1.05 times the lower. If desired several velocities and corresponding dials may be used. Furthermore, the invention may be applied to distance measuring apparatus other than altimeters.

While I have shown and described a particular embodiment and mentioned certain modifications of my invention, it will be apparent that numerous other variations and modifications thereof may be made without departing from the underlying principles of the invention. I, therefore, desire, by the following claims, to include within the scope of my invention all such variations and modifications by which substantially the results of my invention may be obtained through the use of substantially the same or equivalent means.

I claim:

1. In apparatus for measuring distances, such as altitude, with cathode ray apparatus of the type having means for rotating the cathode ray beam at lower and higher speeds of rotation and having a dial calibrated in a first range of altitudes and upon which altitude at the low beam speed is indicated by the angular distance between displacements in the cathode ray beam trace produced in timed relation to transmitted and reflected pulses, the combination of a dial arranged coaxially with respect to the first mentioned dial, and means for rotatably mounting said last mentioned dial, said last mentioned dial being calibrated to indicate a second range of altitudes according to the difference in the speeds of rotation of the cathode ray beam, whereby the altitude may be read directly from the second dial with the beam rotated at said higher speed and with the second dial having its reference point at the locus of the altitude indication at the lower speed.

2. In apparatus for measuring distances, such as altitude, with cathode ray apparatus of the type having means for moving the cathode ray beam at lower and higher speeds and having a dial calibrated in a first range of altitudes and upon which altitude at the low beam speed is indicated by the distance between displacements in the cathode ray beam trace produced in timed relation to transmitted and reflected pulses, the combination of a dial movably mounted with respect to the first mentioned dial, said last mentioned dial being calibrated to indicate a second range of altitudes according to the difference in the speeds of movement of the cathode ray beam, whereby the altitude may be read directly from the second dial with the beam moved at said higher speed and with the second dial having its reference point at the locus of the altitude indication at the lower speed.

3. In apparatus for measuring distances, such as altitude, with cathode ray apparatus of the type having means for rotating the cathode ray beam at a normal speed and at a second speed one-tenth greater than the first, and means including a dial calibrated in a first range of altitudes to give a unit of distance for one revolution of the beam for providing an indication of altitude by the angular distance between displacements in the cathode ray beam trace produced in timed relation to transmitted and reflected pulses, the combination of a second dial, and means for rotatably mounting said dial coaxial with the first dial, said dial having an altitude calibration range ten times as great as that of the first, whereby altitudes above the range of the first dial may be read directly from the second dial with the beam rotated at said higher speed and with the second dial having its reference point at the locus of the altitude indication at the lower speed.

4. In an electronic altimeter of the electronic beam type having a viewing screen with a dial calibrated in a first range of altitudes, the combination including, a second dial having a reference point and being calibrated in a range of altitudes greater than the range indicated on the first dial, said second dial being so arranged with respect to the viewing screen and the first dial that the indicia carried by said second dial can be read in conjunction with the electron beam trace on the viewing screen, means mounting said second dial for movement relative to the viewing screen and the first dial so that the reference point may be moved to different positions relative to the first dial.

JOSEPH KOMM.

REFERENCES CITED

The following references are of record in the file of this patent:

UNITED STATES PATENTS

| Number | Name | Date |
|---|---|---|
| 1,924,156 | Hart | Aug. 29, 1933 |
| 2,209,191 | Dearing | July 23, 1940 |
| 2,227,598 | Lyman et al. | Jan. 7, 1941 |
| 2,312,203 | Wallace | Feb. 23, 1943 |
| 2,399,671 | Gage | May 7, 1946 |
| 2,426,501 | Hart | Aug. 26, 1947 |
| 2,427,686 | Muller | Sept. 23, 1947 |